United States Patent
Day

(10) Patent No.: US 7,433,570 B2
(45) Date of Patent: Oct. 7, 2008

(54) SLACK STORAGE SYSTEM

(75) Inventor: Steven Day, Alden, IA (US)

(73) Assignee: Tunnel Mill Polymer, Inc., Alden, IA (US)

( * ) Notice: Subject to any disclaimer, the term of this patent is extended or adjusted under 35 U.S.C. 154(b) by 0 days.

(21) Appl. No.: 11/291,128

(22) Filed: Nov. 30, 2005

(65) Prior Publication Data

US 2007/0122100 A1    May 31, 2007

(51) Int. Cl.
    *G02B 6/00* (2006.01)
(52) U.S. Cl. .......................... 385/135; 385/138
(58) Field of Classification Search ................. 385/135, 385/138
    See application file for complete search history.

(56) References Cited

U.S. PATENT DOCUMENTS

| | | | | |
|---|---|---|---|---|
| 4,551,719 A | * | 11/1985 | Carlin et al. | 340/825.6 |
| 4,805,979 A | * | 2/1989 | Bossard et al. | 385/135 |
| 4,986,762 A | * | 1/1991 | Keith | 439/131 |
| 5,069,516 A | * | 12/1991 | Kohy et al. | 385/147 |
| 5,093,886 A | * | 3/1992 | Smoker et al. | 385/135 |
| 5,231,687 A | * | 7/1993 | Handley | 385/139 |
| 5,434,944 A | * | 7/1995 | Kerry et al. | 385/135 |
| 5,617,501 A | * | 4/1997 | Miller et al. | 385/134 |
| 5,644,671 A | * | 7/1997 | Goetter et al. | 385/135 |
| 5,706,384 A | * | 1/1998 | Peacock et al. | 385/135 |
| 5,711,033 A | * | 1/1998 | Green et al. | 2/171.3 |
| 5,758,004 A | * | 5/1998 | Alarcon et al. | 385/135 |
| 5,887,281 A | * | 3/1999 | Green et al. | 2/171.3 |
| 6,181,861 B1 | * | 1/2001 | Wenski et al. | 385/135 |
| 6,829,424 B1 | * | 12/2004 | Finzel et al. | 385/135 |
| 6,856,748 B1 | * | 2/2005 | Elkins et al. | 385/135 |
| 2005/0017078 A1 | * | 1/2005 | Bhatia et al. | 235/462.45 |
| 2005/0185895 A1 | * | 8/2005 | Keenum et al. | 385/76 |
| 2005/0213921 A1 | * | 9/2005 | Mertesdorf et al. | 385/135 |
| 2006/0115220 A1 | * | 6/2006 | Elkins et al. | 385/87 |
| 2006/0153516 A1 | * | 7/2006 | Napiorkowski et al. | 385/135 |
| 2006/0153517 A1 | * | 7/2006 | Reagan et al. | 385/135 |
| 2006/0214039 A1 | * | 9/2006 | Domanico | 241/99 |

* cited by examiner

*Primary Examiner*—K. Cyrus Kianni
(74) *Attorney, Agent, or Firm*—Emily E. Harris; Kent A. Herink

(57) ABSTRACT

A slack cable storage system is provided which stores slack cable under a fiber access terminal or pedestal and provides support for the terminal or pedestal. The slack cable is thus stored under the terminal and is available for splicing or restoration of service. The cable entry to the terminal or pedestal is sealed to keep humid air in the storage system out of the terminal.

10 Claims, 9 Drawing Sheets

SLACK STORAGE SYSTEM

BACKGROUND OF THE INVENTION

The invention relates generally to a system for storing slack cable and, more particularly, to a slack storage system that stores slack cable underneath a fiber optic cable access terminal or pedestal and also provides support for the terminal or pedestal.

Demand for increased communications bandwidth has encouraged construction of telecommunications networks in which fiber optic cable is used for transmission directly to a telecommunications subscriber's premises, rather than running copper wire to the premises, as has been used in the past. In a community with a fiber optic network, multi-fiber underground distribution cable is commonly installed by plowing it through the area to be served, and splicing the distribution cable into individual fiber cables that continue to each subscriber.

In a typical situation, the distribution cable that runs through a residential neighborhood might have one or two splice points on each block. Each of the subscriber residences on that block would be connected to the fiber optic system by a single fiber cable running from the home or business to the splice point.

Fiber optic cable splicing is most often done in an enclosed trailer that houses the specialized equipment in a controlled environment. Splicing requires there to be adequate slack cable available at each splicing location to reach the trailer. On early fiber to the home projects, slack cable has been stored by installing a relatively expensive and heavy precast vault that also housed the splice itself. These vaults had earlier been used to house the splices in fiber optic trunk transmission lines connecting cities. This approach, however, requires that the splice be protected from ground water in an expensive housing, and does not lend itself to adding new subscriber lines.

More recently, the trend has been to house the splice in an above-ground fiber access terminal, an adaptation of the pedestals used for copper wire systems. These fiber access terminals offer the advantage of easy access to the distribution cable if additional subscribers are to be added, but do not offer enough storage space for slack cable to reach a splicing trailer. Designers have been forced to either use the expensive precast splicing vaults in connection with the fiber access terminals, or to forgo the slack storage, requiring that splicing be done at the terminal (instead of a splicing trailer) in less than ideal conditions. Additionally, when the slack cable is not available, it is more difficult, time consuming, and expensive to re-establish service in the event a distribution cable is cut.

When conventional precast splicing vaults are used for storage under the fiber access terminals, a rectangular opening is cut into the lid of the vault, and the pedestal is inserted into the opening. Because the vaults are traditionally open bottomed, it is a source of humidity, and is relatively warmer than the air in the pedestals during the fall and early winter. The warm, humid air rises into the pedestal and condenses, creating moisture, frost, and ice. This creates problems when the pedestal must be opened.

The previously used precast vaults were rectangular, and thus required that the material used in the vaults be sufficiently rigid to withstand the soil and vehicle approach loads.

Also, the previous storage vaults required that the pedestal be inserted into an opening cut into the lid of a precast vault, which was then installed with the lid at grade (ground) level. This meant that all drop cables installed had to be installed by running them under the edge of the vault, up through the vault with the distribution and branch cables. This method is less convenient than being able to bring a single drop cable into the pedestal by going through the sidewall or under the edge of the pedestal.

Because the lid of the vault used in previous methods had to be even with the ground, it was difficult to achieve a plumb installation of the pedestal if the ground surface at the pedestal location was steeply sloped.

SUMMARY OF THE INVENTION

In accordance with the present invention, a slack storage system is provided which stores slack cable underneath a fiber access terminal or pedestal and also supports the terminal or pedestal.

Accordingly, an object of the present invention is to provide storage space for slack cable.

A further object of the present invention is to provide a relatively inexpensive, lightweight slack cable storage system.

Another object of the present invention is to provide a slack storage system that is resistant to jobsite damage.

A further object of the present invention is to provide a slack storage system that supports a fiber access terminal or pedestal.

These and other objects of the present invention will become apparent to those skilled in the art upon reference to the following specification, drawings, and claims.

DETAILED DESCRIPTION OF THE INVENTION

Figure 1:
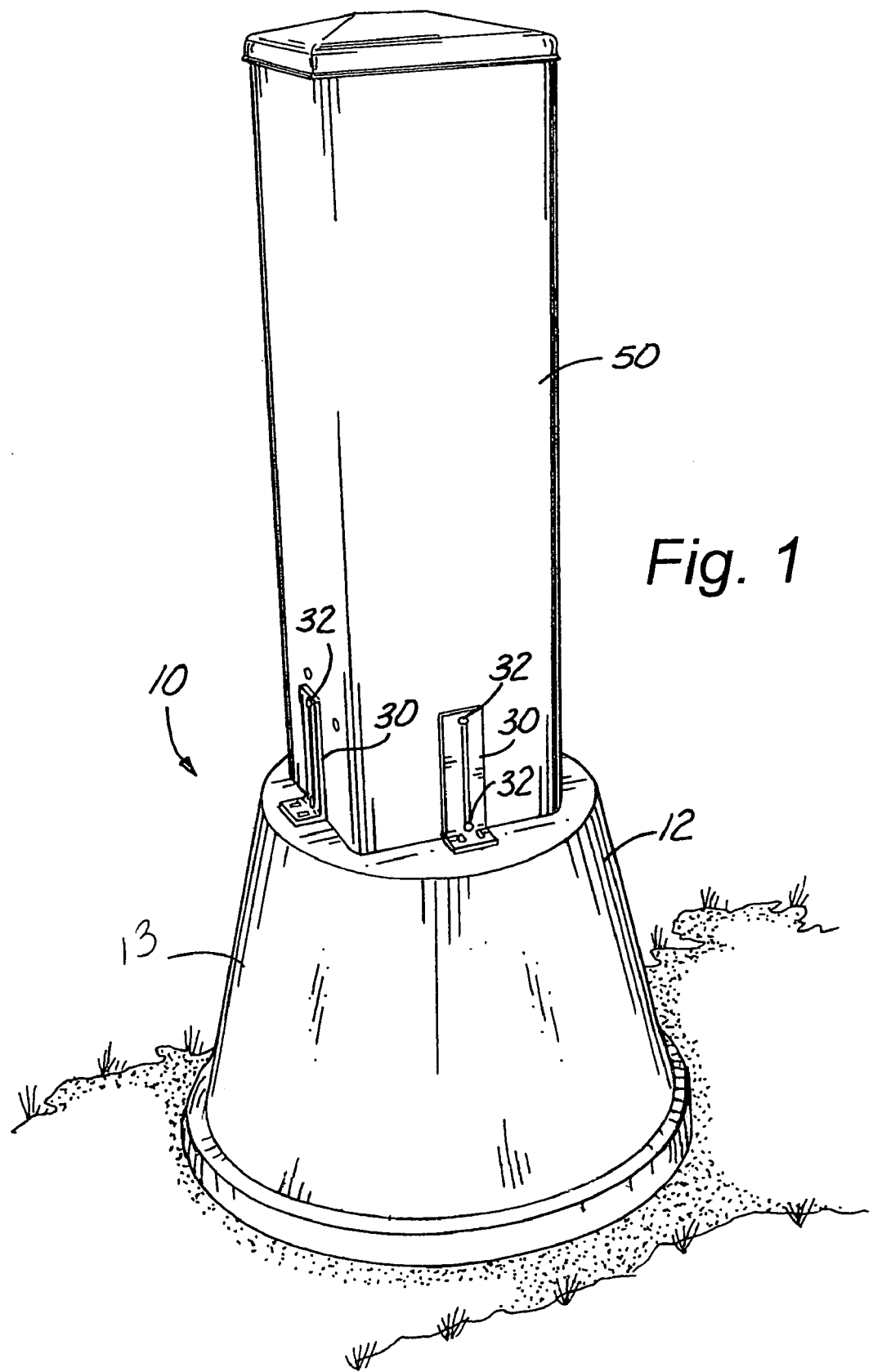
FIG. 1 is a view of the slack storage system of the present invention attached to a fiber access terminal.

Illustrated in FIG. 1 is the storage system 10 of the present invention. The storage system 10 generally includes a hollow housing 12 that may be attached to a fiber access terminal 50. The hollow housing 12 may be conical or a frustrum. The housing 12 includes at least one sidewall 13. The shape of the cone 12 resists soil loading during installation and backfill, as well as wheel loads imposed by vehicles that might approach or pass over the pedestal. The cone 12 lends to coiling of fiber optic cable, as the natural stiffness of fiber optic cable makes it hug the interior wall of the cone shape.

Figure 2:
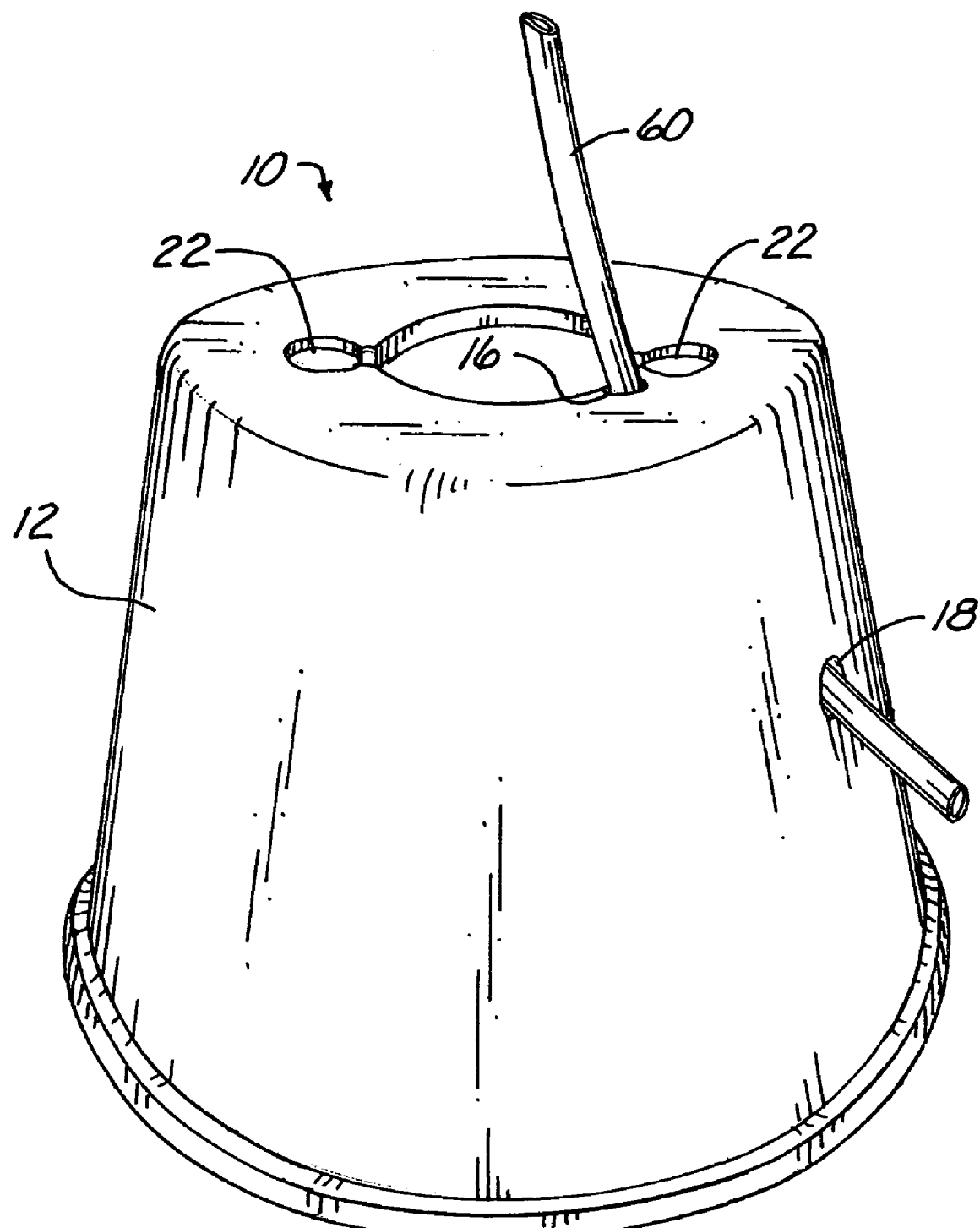
FIG. 2 is a view of the cone of the slack storage system of the present invention with a drop cable entering through the side of the cone.
Figure 3:
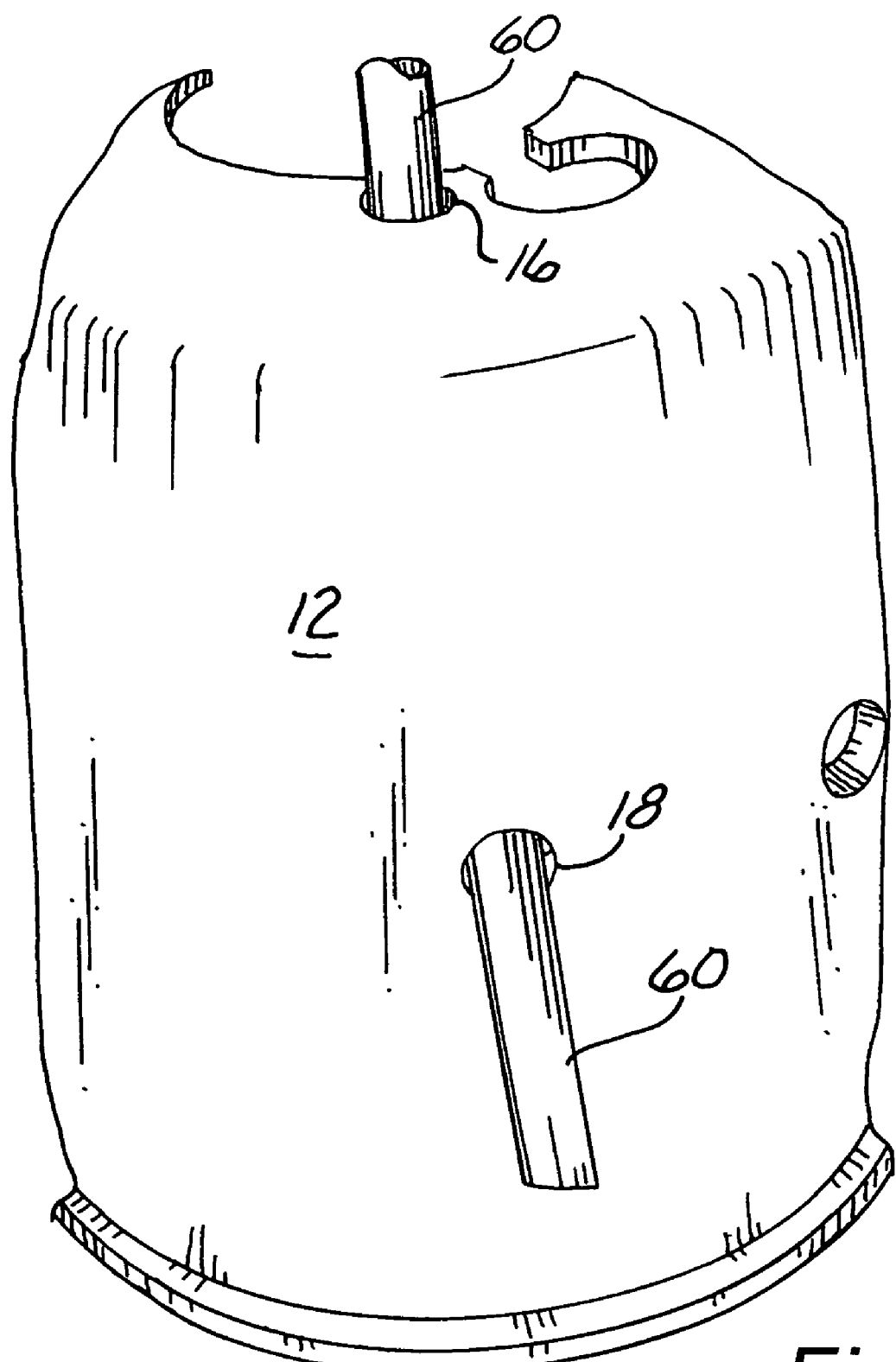
FIG. 3 is a close view of the drop cable entry and exits points of the present invention.
Figure 7:
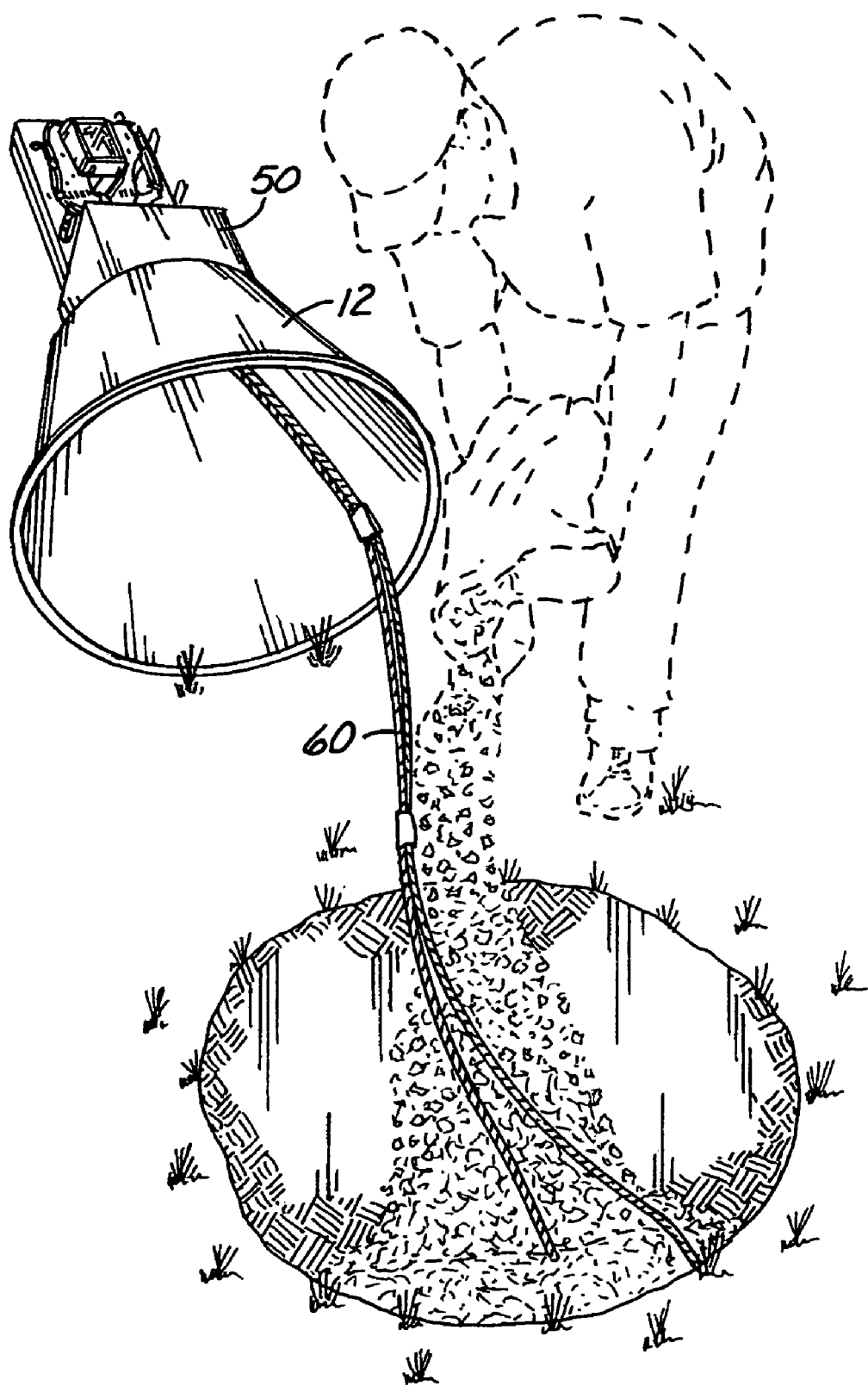
FIG. 7 is view of the bottom of the slack storage system of the present invention.

As seen in FIG. 7, cable 60 enters the cone 12 through the open bottom 13. FIGS. 2-3 demonstrate another embodiment in which openings 16 have been cut into the side of the cone 12 for the cable 60 to enter the cone 12. A loop of distribution cable 60, along with any branch cables and the single fiber subscriber cables enter the fiber access terminal 50 from the cone 12 through a round access opening 18. This arrangement provides an opening into the cone 12 large enough to manipulate the cable 60 as it is coiled, and allows the cable 60 to loop in large enough of a diameter that the fiber optic fibers are not damaged. Additionally, any number of slots or other openings 22 may be provided in the top of the cone 12 to allow cable to enter or exit the fiber access terminal 50 or pedestal.

Figure 8:
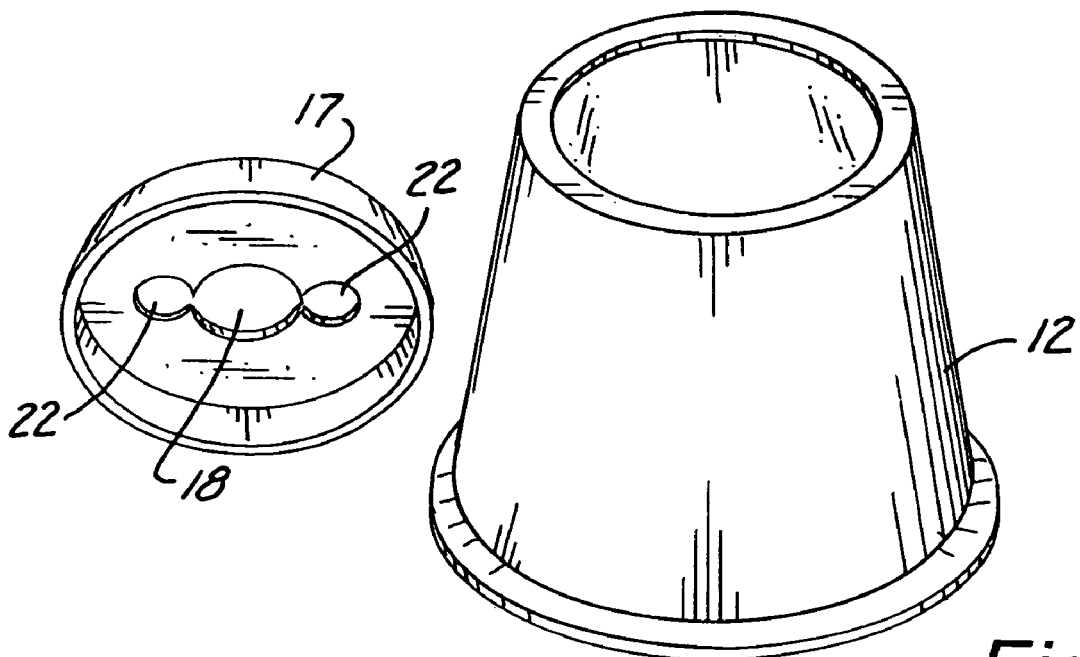
FIG. 8 is a view of the removeable top embodiment of the slack storage system of the. present invention.
Figure 9:
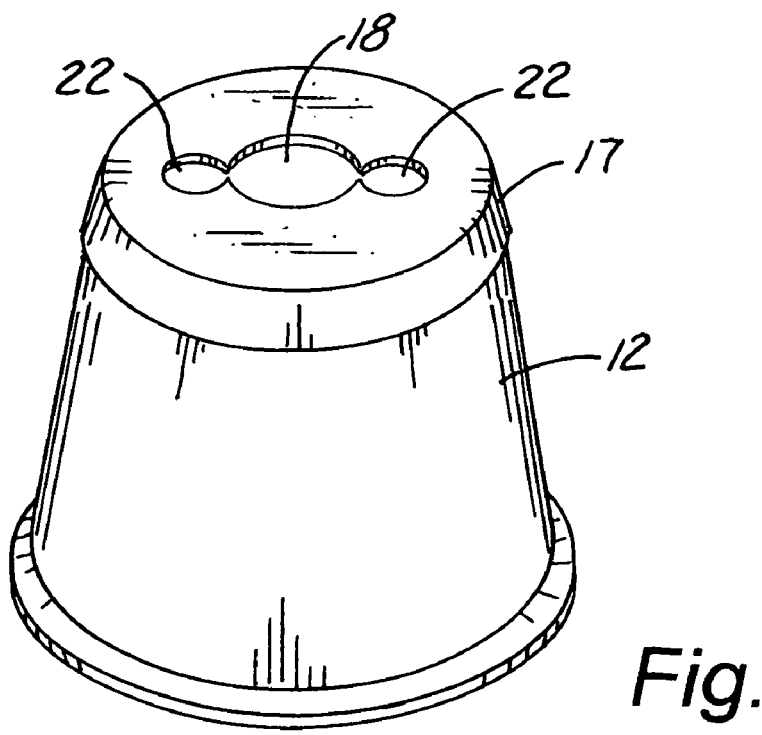
FIG. 9 is a view of the removeable top embodiment of the slack storage system of the present invention.

For easier access to the cone 12, the cone 12 may be equipped with a removable top 17, as shown in FIGS. 8-9.

Figure 4:
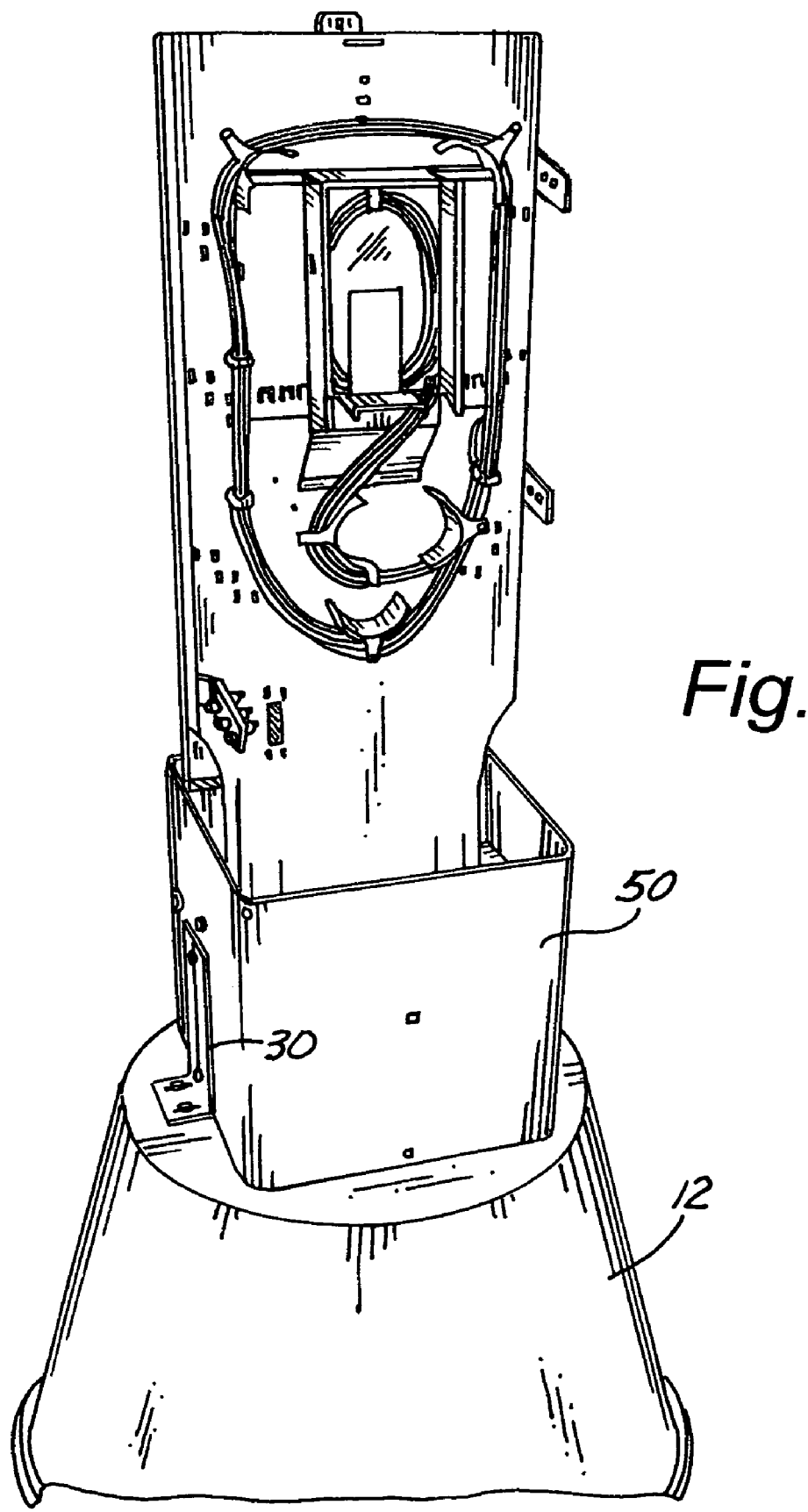
FIG. 4 is a view of the cone of the slack storage system of the present invention attached to a fiber access terminal.

Brackets 30 with fasteners 32 are used to secure the fiber access terminal 50 to the cone 12 (FIGS. 1, 4). These brackets 30 may be non-metallic and the fasteners may be made from stainless steel, thus allowing the attachment to be capable of withstanding wind loads. In one embodiment, three brackets 30 are attached using bolt-holes provided in the fiber access terminal for stake mounting.

Figure 6:
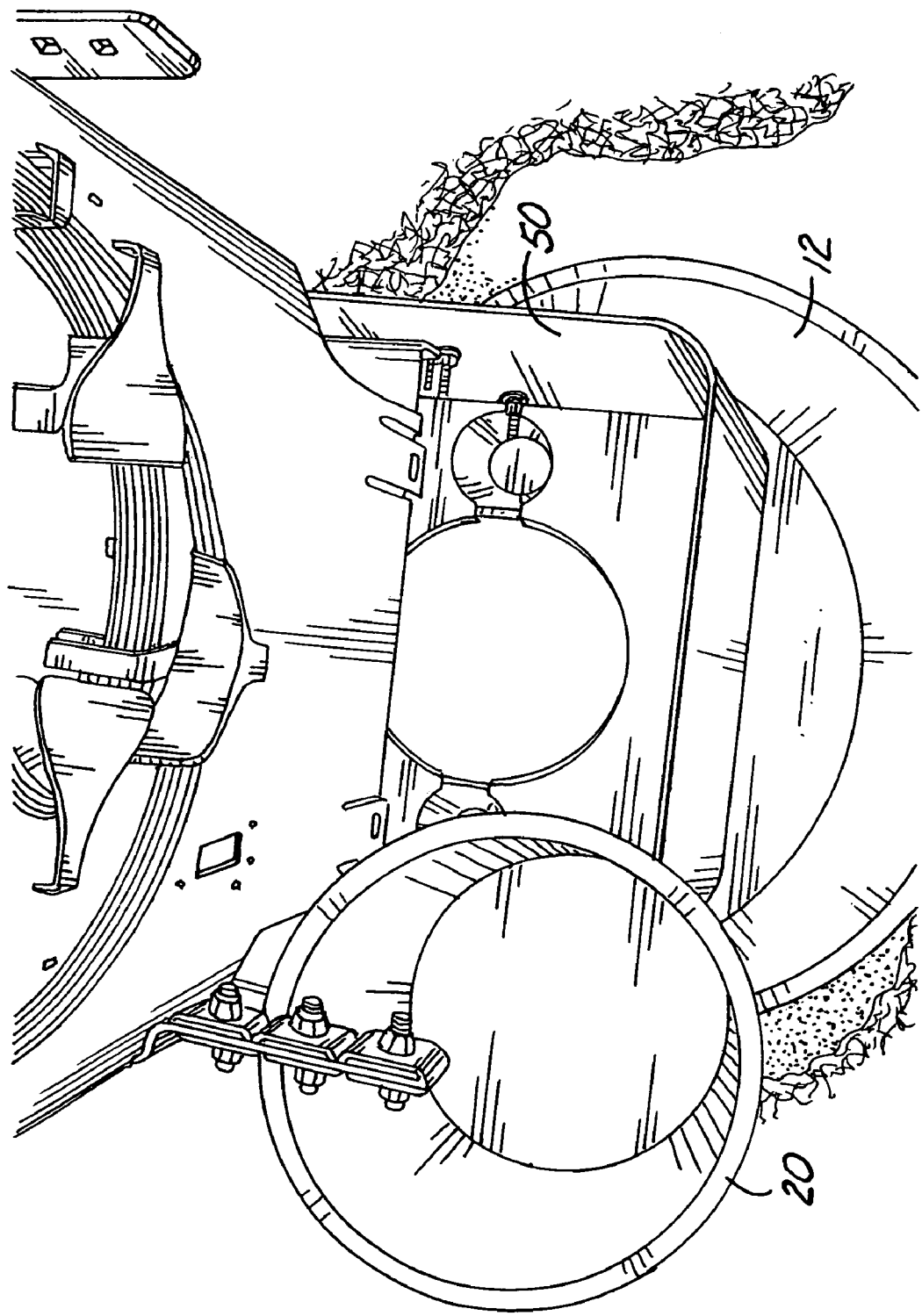
FIG. 6 is a view of the top of the slack storage system of the present invention.
Figure 10:
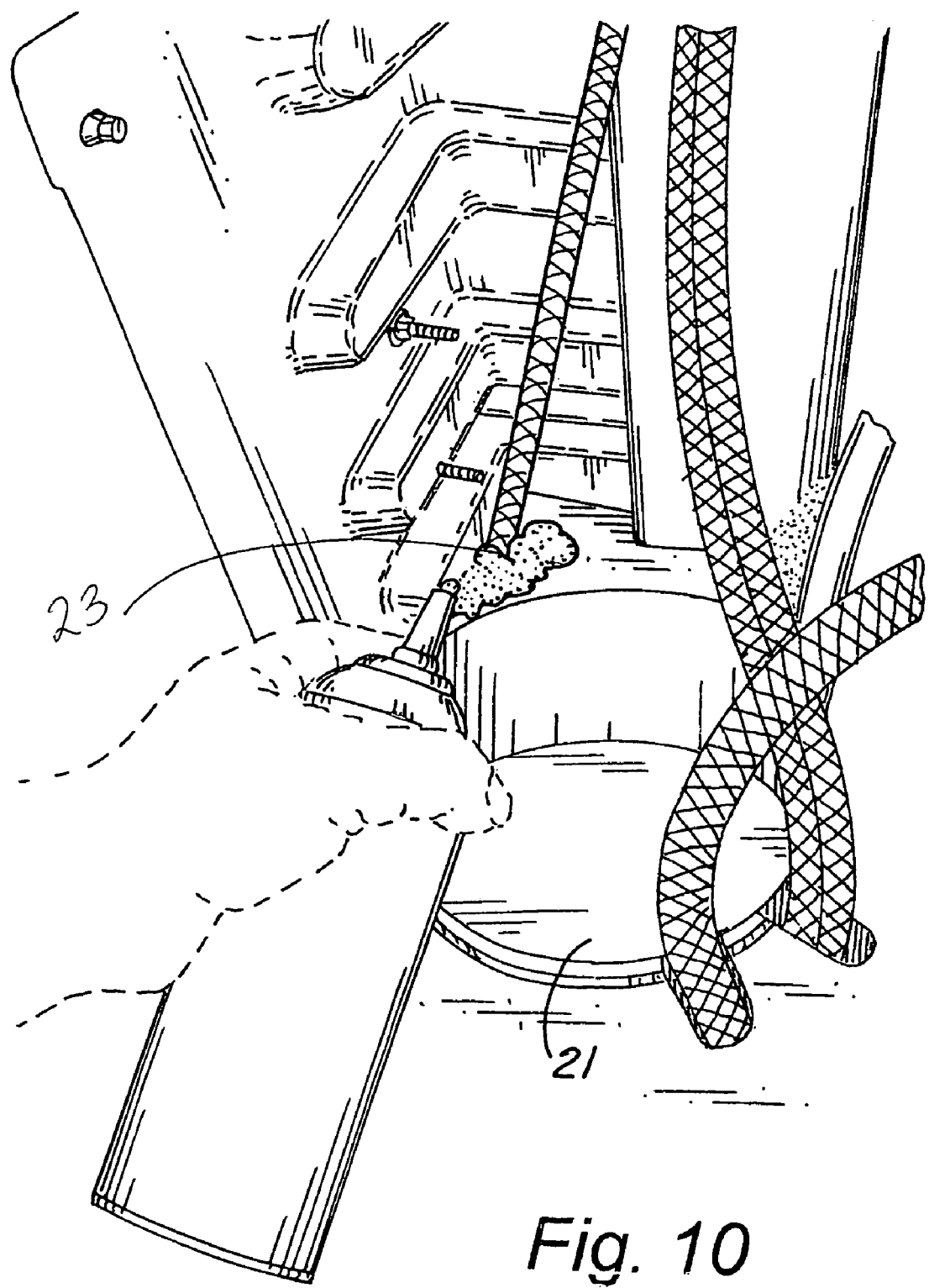
FIG. 10 is a view of the system of sealing the slack storage system of the present invention.

The access opening 18 is closed with an injection molded plastic cup 20, and the slots and other openings 22 are sealed with foam rubber or a moldable sealing compound 23 (FIGS. 6, 10). Smaller injection molded plastic cups 21 may also be used to close the openings 22. The sealing arrangement prevents humidity from the cone 12 from migrating into the fiber access terminal 50. The seal eliminates problems with condensation, frost, and icing.

Figure 5:
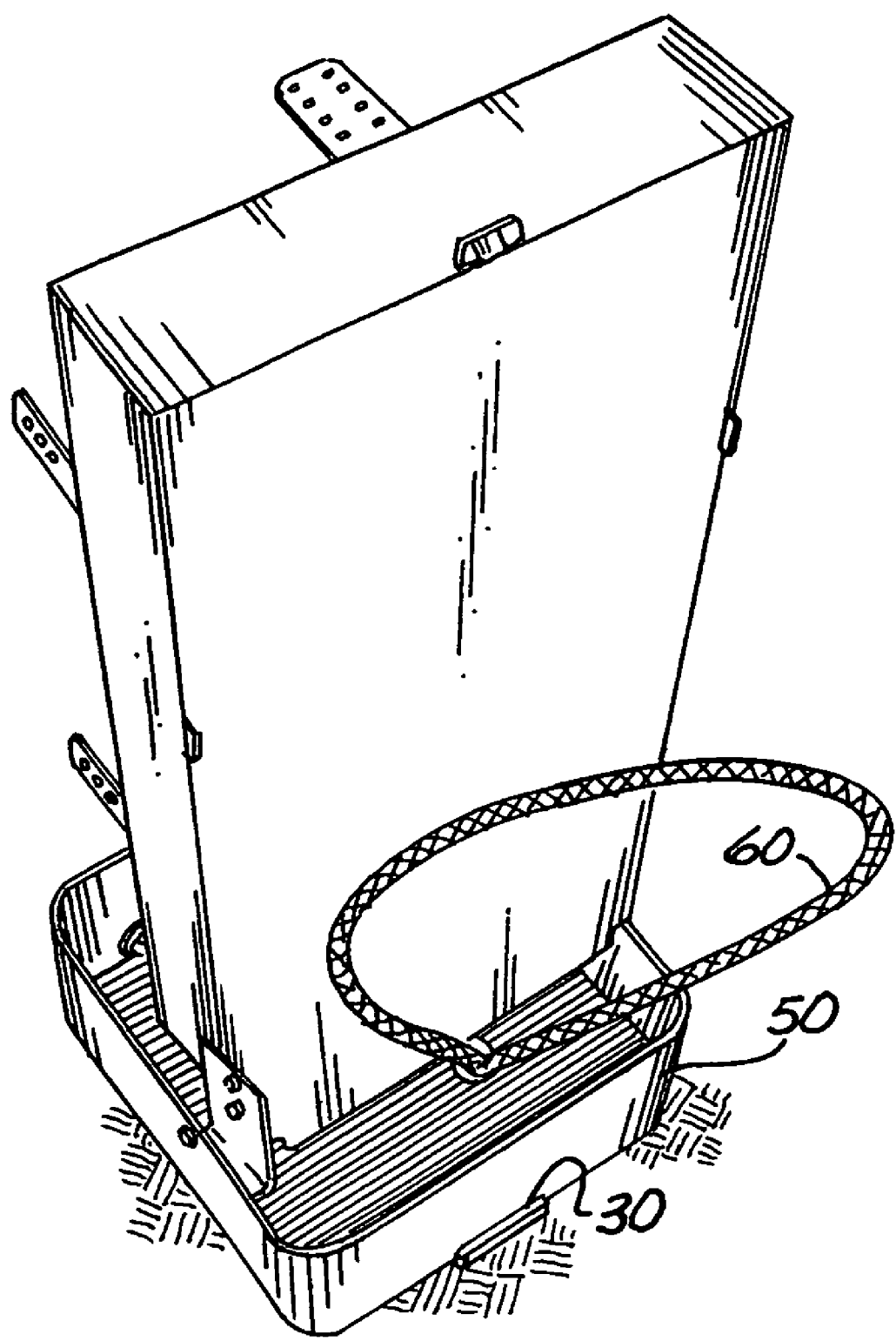
FIG. 5 is an above view of a fiber access terminal supported by a below-ground slack storage system of the present invention.

As shown in FIG. 5, the cone 12 is buried in the ground so that the pedestal of terminal 50 sits plumb with the ground. A loop of cable 60 is inside the pedestal and is fed down into the cone 12.

In one embodiment, the cone 12 is made from blow-molded thermoplastic. The cone 12 can also be made from polymer concrete, portland cement concrete, or fiber-reinforced plastic. The size of the cone 12 can vary depending on the amount of slack storage that is required. The fasteners and openings in the cone 12 are also configured to suit the specific fiber access terminal or pedestal 50 of a particular project.

The cone 12 may be used with a fiber access terminal 50, or with a pedestal (not shown) that has been traditionally when copper wire runs to a subscriber's premises instead of fiber optic cable.

The slack storage system of the current invention allows for slack cable to be stored under a fiber access terminal or pedestal and provides support for the pedestal. The current invention makes it possible to seal the humid air out of the pedestal. The shape of the current invention allows the use of thermoplastic material, resulting in lower cost and weight. Also, the thermoplastic material of the current invention is much more resistant to jobsite damage than the previous materials used. Additionally, because the current invention is entirely below ground, the slope at the surface is not a factor, and the pedestal installation can be plumb.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art who have the disclosure before them will be able to make modifications and variations therein without departing from the scope of the invention.

The invention claimed is:

1. A slack cable storage system comprising a hollow housing with a sidewall, a top, a plurality of openings for cable to enter and exit the housing, and at least one of the openings is in the top of the housing, said housing being of a size to allow for coiling of slack cable within the housing, wherein the top of the housing releasably attaches to a fiber access terminal at the bottom end of the fiber access terminal.

2. The slack cable storage system of claim 1 wherein the housing is conical.

3. The slack cable storage system of claim 1 wherein the housing is made from thermoplastic.

4. The slack cable storage system of claim 1 wherein the housing top is removable.

5. The slack cable storage system of claim 1 wherein cable within the housing loops in conformity to the interior of the housing.

6. The slack cable storage system of claim 1 wherein the housing located substantially below ground level.

7. The slack cable storage system of claim 1 wherein the housing further comprises an open bottom.

8. The slack cable storage system of claim 7 wherein the cable enters the housing through the open bottom.

9. The slack cable storage system of claim 1 wherein the openings adapted for cable to enter and exit the housing are sealed with sealing compound.

10. The slack cable storage system of claim 9 wherein the sealing compound is foam rubber.

* * * * *